United States Patent [19]

Youngblood

[11] Patent Number: 5,359,229
[45] Date of Patent: Oct. 25, 1994

[54] APPARATUS FOR CONVERTING WAVE MOTION INTO ELECTRICAL ENERGY

[76] Inventor: George M. Youngblood, 12935 Wincrest Ct., Cypress, Tex. 77429

[21] Appl. No.: 218,838

[22] Filed: Mar. 28, 1994

Related U.S. Application Data

[63] Continuation-in-part of Ser. No. 102,891, Aug. 6, 1993, abandoned.

[51] Int. Cl.⁵ .................... F03B 13/12; F03B 13/18
[52] U.S. Cl. .................................... 290/53; 60/502; 60/507; 290/42; 417/331; 417/333
[58] Field of Search .............. 60/502, 507; 290/42, 290/53; 417/331, 333

[56] References Cited

U.S. PATENT DOCUMENTS

| | | | |
|---|---|---|---|
| 321,229 | 6/1885 | Leavitt | 60/507 |
| 1,346,399 | 7/1920 | Crawford-Frost | 60/504 |
| 3,567,953 | 3/1971 | Lord | 290/42 |
| 3,894,241 | 7/1975 | Kaplan | 290/42 |
| 3,922,013 | 11/1975 | Tidwell | 290/53 |
| 4,073,142 | 2/1978 | Tornabene | 60/502 |
| 4,145,885 | 3/1979 | Solell | 60/504 |
| 4,228,360 | 10/1980 | Navarro | 290/43 |
| 4,434,375 | 2/1984 | Taylor | 290/53 |
| 4,455,824 | 6/1984 | Dabringhaus | 60/507 |
| 4,539,484 | 9/1985 | Suggs | 290/53 |
| 4,803,839 | 2/1989 | Russo, III | 60/501 |
| 5,066,867 | 11/1991 | Shim | 290/53 |

FOREIGN PATENT DOCUMENTS

| | | | |
|---|---|---|---|
| 2339071 | 9/1977 | France | 290/53 |
| 272475 | 12/1986 | Japan | 290/53 |

*Primary Examiner*—a. D. Pellinen
*Assistant Examiner*—Robert Lloyd Hoover

[57] ABSTRACT

Apparatus for producing electrical energy from the rise and fall of waves on a body of water. A vertical column is anchored to the floor of the body of water. A buoyant, spherical float is telescopically mounted to the vertical column in a manner that allows it to rise and fall with the waves, guided by the vertical column. A drive shaft is mounted to the vertical column and above the float. A downstroke drive transfer mechanism is mounted to the drive shaft. A first cable is attached to the float and to the downstroke drive transfer mechanism. A second cable is attached to a counter-weight and to the downstroke drive transfer mechanism. As the float falls as a wave trough passes, the downward motion of the float is transferred to the downstroke drive transfer mechanism through the first cable, causing the drive shaft to rotate. The drive shaft does not rotate as the float rises. The drive shaft is connected to an electrical energy generating system.

22 Claims, 12 Drawing Sheets

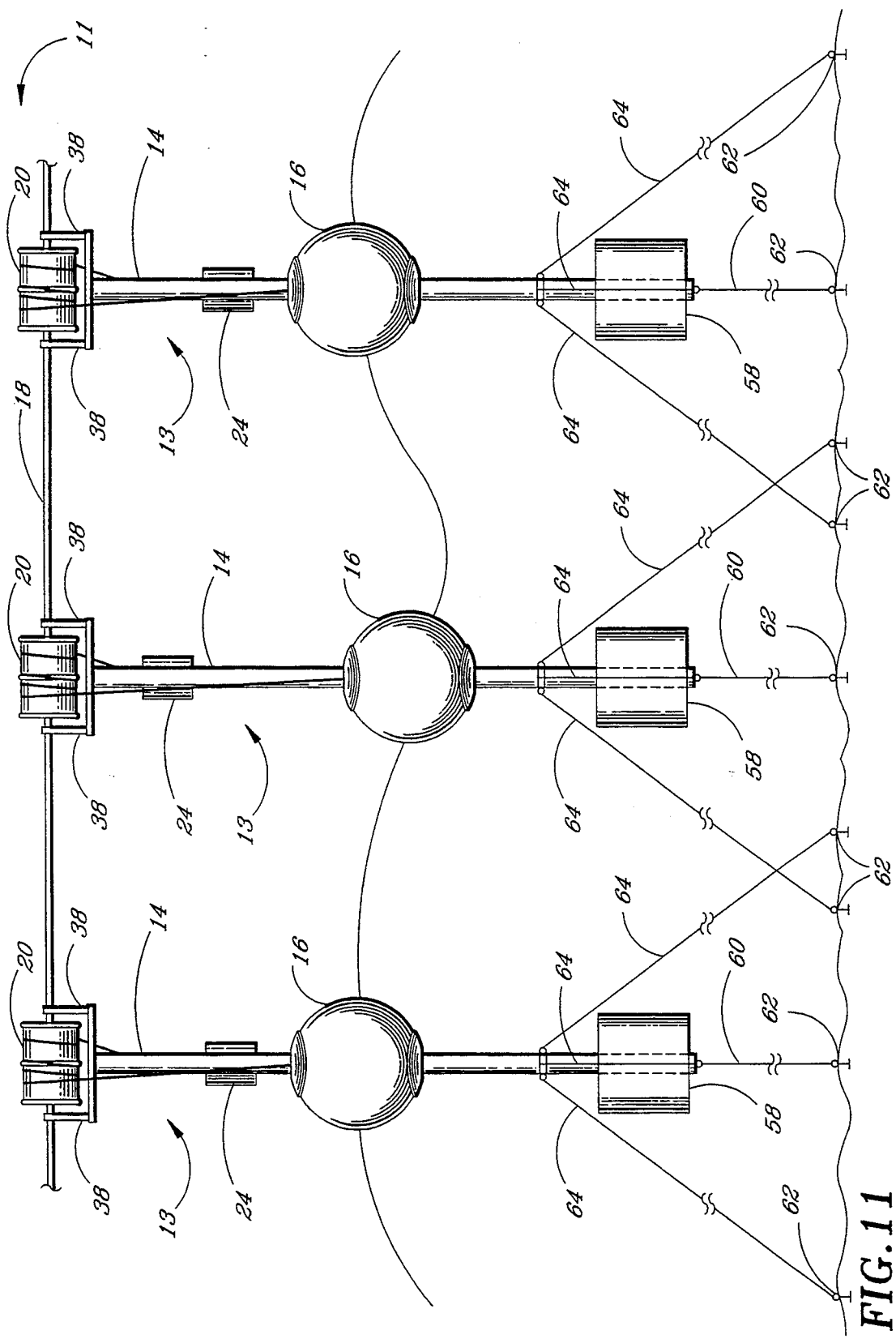

5,359,229

APPARATUS FOR CONVERTING WAVE MOTION INTO ELECTRICAL ENERGY

This application is a continuation-in-part of application Ser. No. 08/102,891, filed Aug. 6, 1993, now abandoned.

BACKGROUND

It is well known that the periodic rising and falling of waves on the surface of a body of water provides a potential source of energy for conversion to useful power by man. Various structures have been proposed to harness this energy. The apparatus that will be most beneficial to man will be one that can be economically constructed and operated for use in locales that are suitable environments for wave energy conversion. These locales will generally be removed from more conventional sources of power generation. Additionally, a successful wave energy conversion apparatus must operate reliably in a harsh environment that could consist of salt-water, high winds, and constant wave action. Furthermore, the apparatus must be easily maintained.

SUMMARY

The present invention is directed to an apparatus that economically and reliably converts wave motion to electrical energy, and which is easy to maintain. An apparatus having features of the present invention comprises a series of conversion units interconnected so as to provide continuous rotation of a drive shaft that is connected to an electrical generator. Each conversion unit is comprised of a pylon having a lower portion submerged beneath the surface of a body of water and a top portion extending above the surface of the water. The pylon is held in a fixed position relative to the surface of the water by anchoring the pylon to the floor of the body of water. Attached to the pylon is a float which rises and falls with the rise and fall of waves on the surface of the body of water. The float has a generally spherical exterior and an internal chamber. Ballast such as water is contained within the internal chamber to provide weight to the float. The float further has a central opening through its vertical axis. Mounted within the central opening is a central guide means having a guide sleeve and a plurality of bearings secured to the guide sleeve. The central guide means allows the float to be telescopically fitted around the pylon. The float is thus guided so that it will slide up and down the pylon in a direction parallel to the vertical axis of the pylon.

A drive shaft is rotatably mounted to the pylon above the float. A downstroke drive transfer mechanism is mounted to the drive shaft. The float is connected to the downstroke drive transfer mechanism through a first cable means. A counter-weight is connected to the downstroke drive transfer mechanism through a second cable means.

The downstroke drive transfer mechanism is configured so that the drive shaft is rotated in a predetermined direction as the float moves downwards as a wave trough passes. As the float moves upwards in response to a passing wave crest, the counter-weight falls, causing the first cable means to wind around the downstroke drive transfer mechanism. The drive shaft is not rotated in response to the upward motion of the float.

An alternative embodiment of present invention has a pylon having a buoyancy means attached to the bottom portion which has a buoyant force that urges the pylon upwards. The pylon is held rigidly in place by a plurality of cables attached to the bottom of the pylon and anchored to the floor of the body of water.

The interconnected conversion units can be aligned sequentially by connecting the drive shaft of each conversion unit to that of another, with the drive shaft of a terminal conversion unit being connected to an electrical generator.

BRIEF DESCRIPTION OF THE DRAWINGS

These and other features, aspects, and advantages of the present invention will become better understood with regard to the following description, appended claims and accompanying drawings where:

FIG. 11 is an enlarged side view showing the interconnection of an alternative embodiment of the conversion unit embodying the invention.

DESCRIPTION

Figure 3:
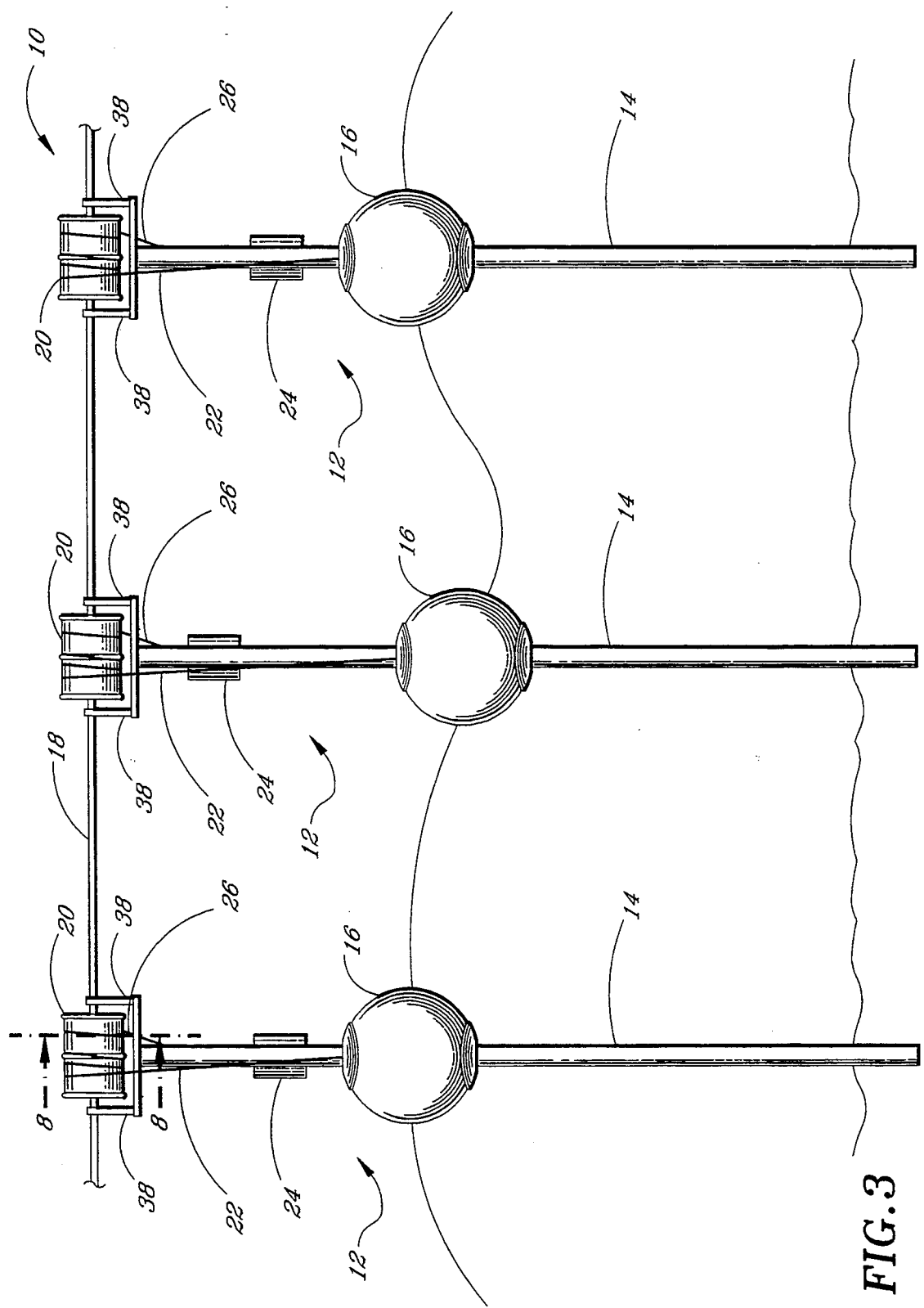
FIG. 3 is an enlarged side view showing the interconnection of one embodiment of the conversion unit embodying the invention.
Figure 4:
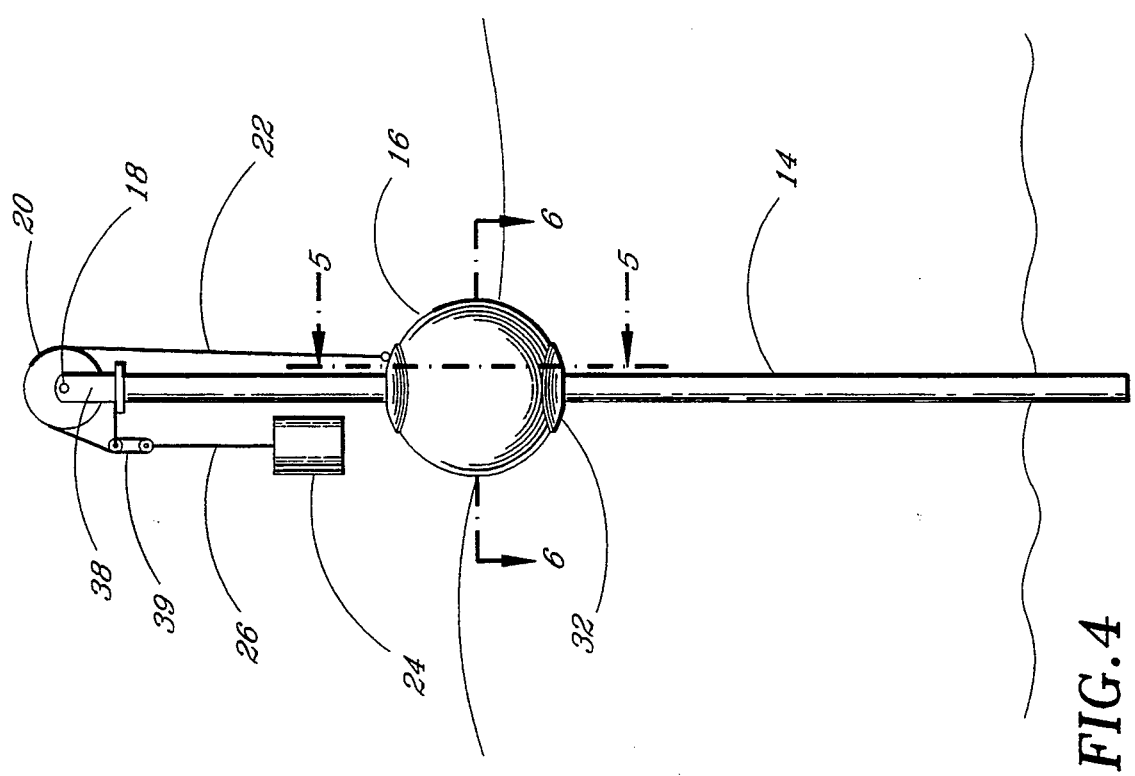
FIG. 4 is an end view of the conversion unit as shown in FIG. 3.

As shown in FIG. 3, an apparatus for converting wave motion into electrical energy is generally designated by numeral 10. The apparatus 10 according to the present invention comprises a plurality of operatively interconnected conversion units 12, each conversion unit having a vertical pylon 14 rigidly attached to the floor of the body of water, a float 16 slideably connected to the pylon 14, a drive shaft 18 rotatably mounted to the pylon 14, a downstroke drive mechanism 20 attached to the drive shaft 18, float cable means 22 having a first end connected to the float 16 and a second end connected to the downstroke drive mechanism 20, a counter-weight 24, and counter-weight cable means 26 (shown in FIG. 4) having a first end connected to the counter-weight 24 and a second end connected to the downstroke drive mechanism 20.

The pylon 14 is a vertical column and has a bottom portion submerged beneath the surface of the water that is securely anchored to the floor of the body of water using conventional marine construction techniques and a top portion extending well above the surface of the water.

Figure 5:
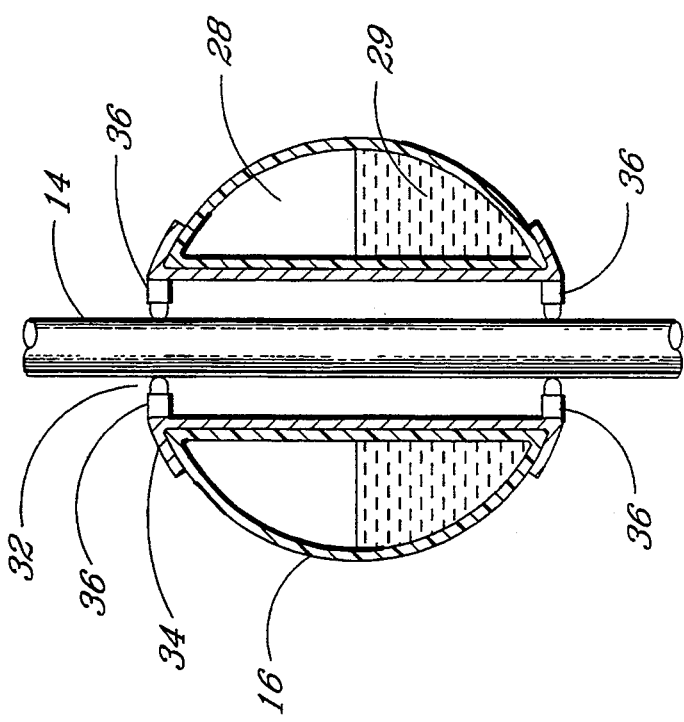
FIG. 5 is a cross section taken substantially on line 5—5 of FIG. 4.

As shown in FIG. 5, the float 16 has a generally spherical shape. The float 16 contains one or more internal chambers 28 which are partially filled with a ballast material 29 such as water. The float will have sufficient buoyancy to be elevated by passing waves and sufficient mass to fall after the waves pass so that the downward movement of the float 16 can be efficiently converted into useful electrical energy in the manner set forth below. It will be understood by those skilled in the art that a plurality of shapes, materials and ballast configurations may be utilized in the float 16 of the present invention.

Figure 6:
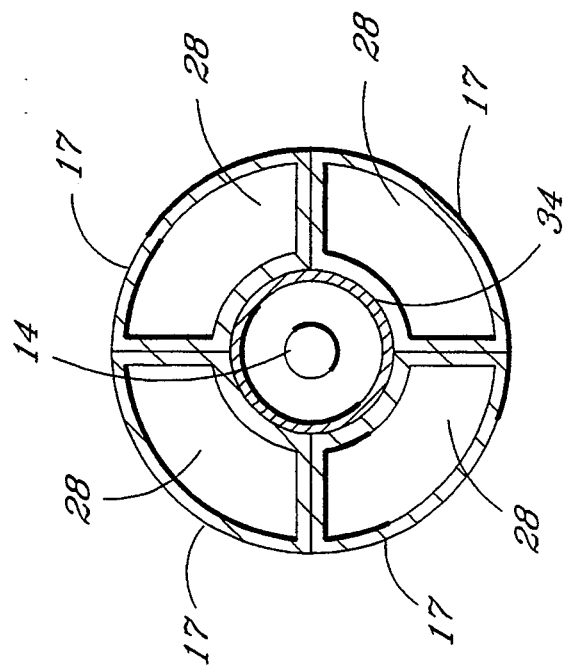
FIG. 6 is a cross section taken substantially on line 6—6 of FIG. 4.

In the preferred embodiment, the float 16 is comprised of a plurality of float segments 17, as best seen in FIG. 6. Each float segment 17 contains a single internal chamber 28 which is partially filled with the ballast material. The individual float segments 17 are bolted together in place around the pylon 14 to form the float 16. The float segments 17 are made of a durable material, such as plastic, fiberglass, aluminium or stainless steel.

As best seen in FIG. 5, the float 16 further has a generally central guide means 32 which telescopes over the vertical pylon 14. The guide means 32 thereby guides the float 16 in a vertical direction parallel to the vertical axis of the pylon 14. In the preferred embodiment of the invention the guide means 32 consists of a guide sleeve 34 and a plurality of roller bearings 36 which allow the float 16 to easily slide up and down the vertical pylon 14 in response to the rise and fall of waves on the surface of the body of water.

The guide sleeve 34 is made in two halves which are joined together using bolts or dowels when the float 16 and guide means 32 are assembled around the pylon 14.

As shown in FIG. 3, the drive shaft 18 is rotatably mounted above the top of the pylon 14 and float 16 and is supported by at least one bearing support 38. In the preferred embodiment, the drive shaft 18 is supported by two bearing supports 38. The drive shaft 18 is driven by the downward vertical motion of the float 16 as shown in more detail below. The drive shaft 18 can be connected in series with other conversion units 12 in the apparatus 10 or may be connected to an electrical generator for producing electricity.

Figure 7:
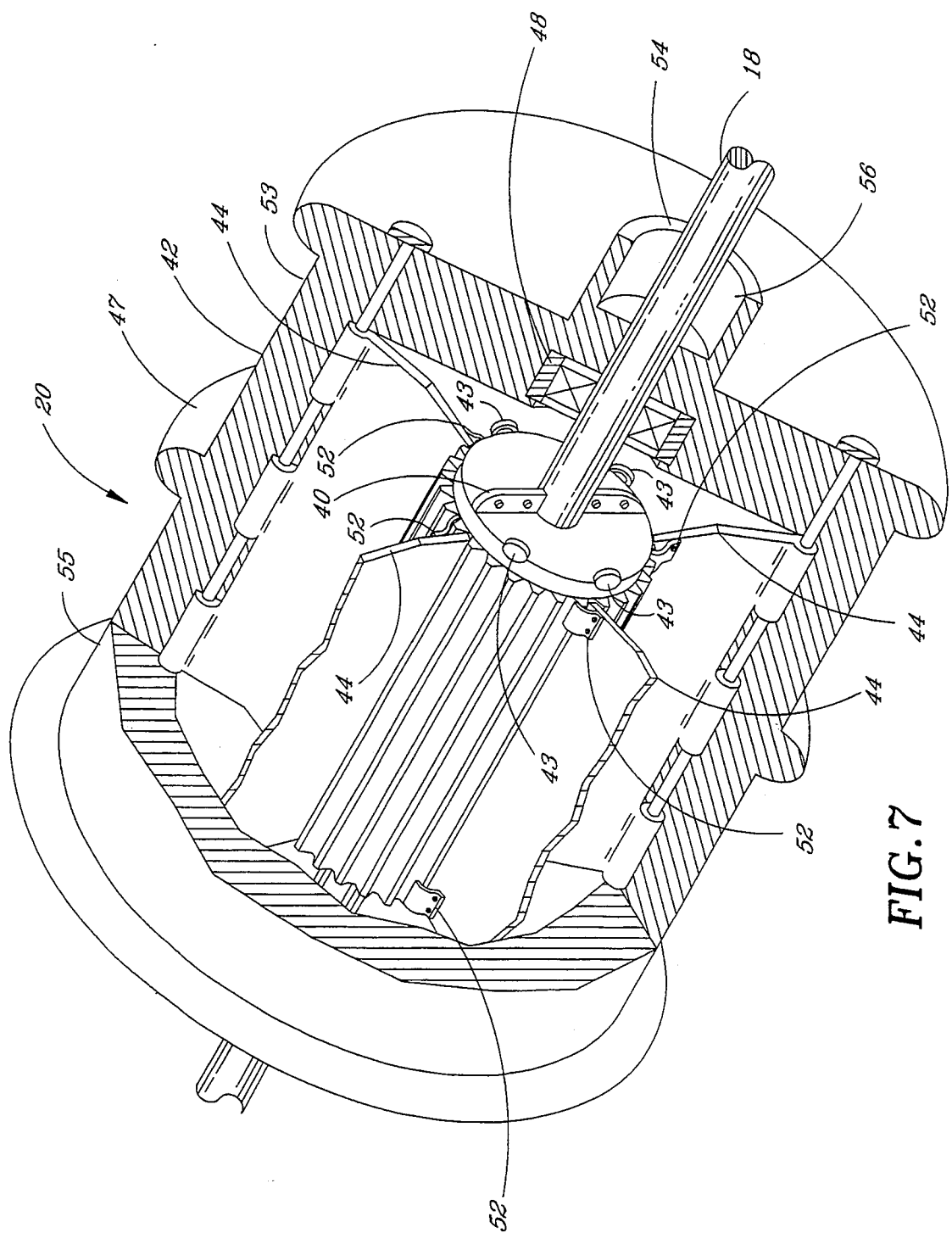
FIG. 7 is an enlarged, partially broken, side view of the down stroke drive mechanism.

The downstroke drive mechanism 20 is provided for converting the downward motion of the float 16 into rotation of the drive shaft 18 in a predetermined direction. As shown in FIG. 7, the downstroke drive mechanism 20 comprises a ratchet drum 40 attached to the drive shaft 18, the surface of the ratchet drum 40 having a plurality of teeth parallel to the drive shaft 18, a drive mechanism housing 42 which encloses the ratchet drum 40 and which is rotatably attached to the drive shaft 18, a plurality of pawls 44 having a first end pivotally connected to the inside surface of the drive mechanism housing 42 and a second end matingly engageable with the teeth of the ratchet drum 40 when the float 16 is moving downwards.

Figure 10:
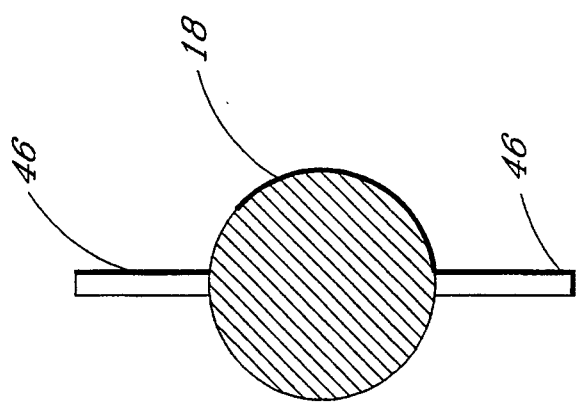
FIG. 10 is an end view of the drive shaft as shown in FIG. 9.
Figure 9:
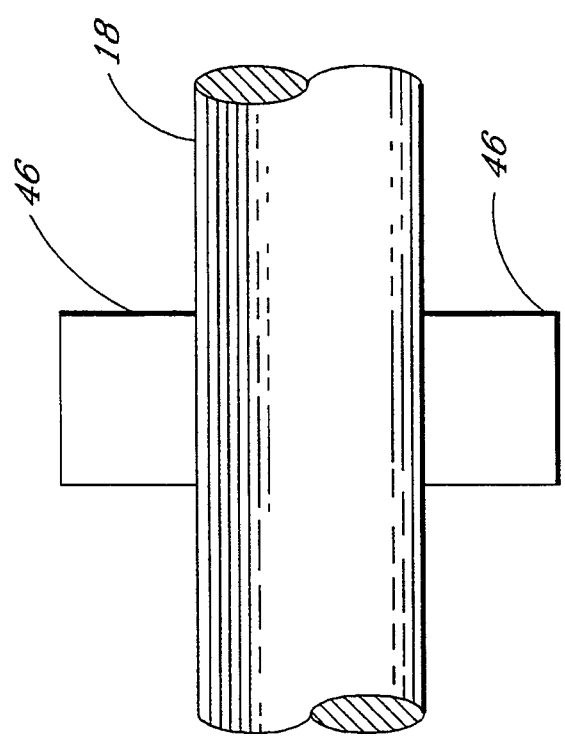
FIG. 9 is a plan view of the drive shaft showing the key.
Figure 12:
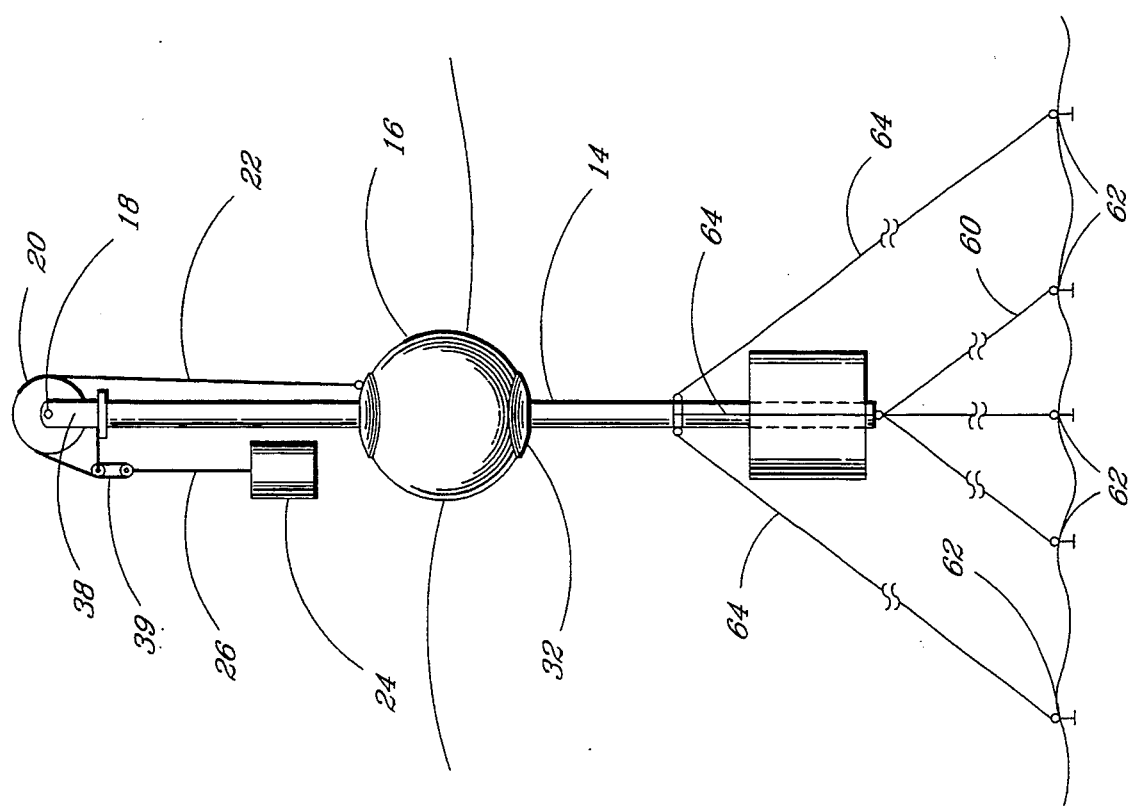
FIG. 12 is an end view of the conversion unit as shown in FIG. 11.

In the preferred embodiment of the present invention the drive shaft 18 has two male keys 46 each located approximately 180 degrees from the other as shown in FIG. 10. The ratchet drum 40 is comprised of two halves, each of which is solid, having a semicircular outer surface, and each having a notch for receipt of one of the male keys 46 on the drive shaft 18. The two halves of the ratchet drum 40 are fastened together around the drive shaft 18 so that one of the notches in the ratchet drum 40 receives one of the keys 46 on the drive shaft 18. The ratchet drum halves can be made of suitable material such as stainless steel and bolted or keyed together over the drive shaft 18.

In the preferred embodiment of the present invention, the drive mechanism housing 42 has roller bearing means 48 on each end for rotatably mounting the drive mechanism housing 42 to the drive shaft 18.

In the preferred embodiment of the present invention, the ratchet drum 40 will also have bearing means 43 for maintaining the ratchet drum 40 aligned within the drive mechanism housing 42, and for preventing the ratchet drum 40 from contacting the inner end walls of the drive mechanism housing 42 due to lateral movement of the drive mechanism housing 42. This bearing means 43 is typically called a runout bearing.

Figure 8:
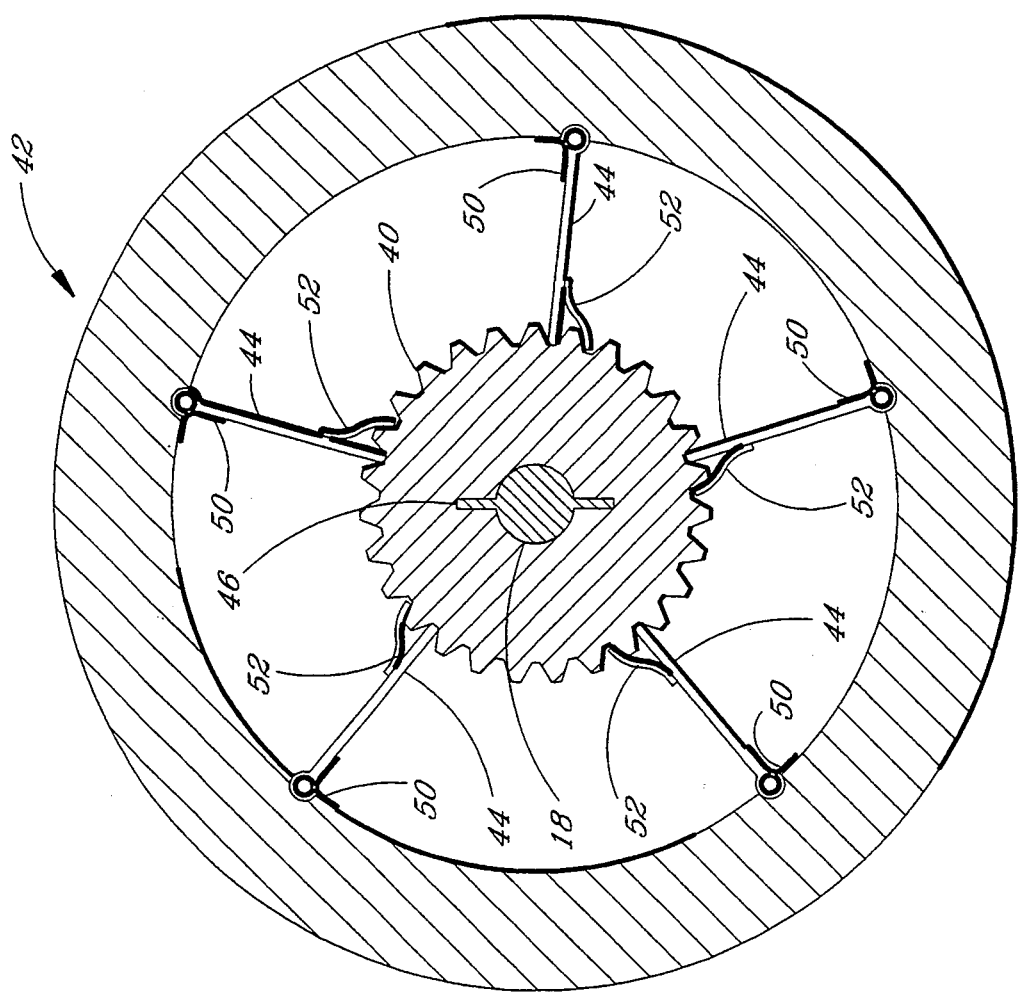
FIG. 8 is an enlarged cross section of the down stroke drive mechanism taken substantially along line 8—8 of FIG. 3.

As best seen in FIG. 8, the drive mechanism housing 42 also includes pawl biasing means 50 for limiting the pivotal movement of each of the pawls 44 as the drive mechanism housing 42 rotates in response to the downward motion of the float 16. The pawl biasing means 50 further will maintain the pawls 44 against the teeth of the ratchet drum 40 when the drive mechanism housing 42 is rotating in response to the downward motion of the float 16.

Each pawl 44 also has means for preventing contact between the pawl 44 and the teeth of the ratchet drum 40, when the drive mechanism housing 42 rotates in response to the downward motion of the counter-weight 24 as the float 16 moves upwards in response to the crest of a wave. The means for preventing contact between the pawls 44 and the teeth of the ratchet drum 40 comprises at least one leaf spring 52 attached to the end of the pawl 44 which engages the ratchet drum teeth. The preferred embodiment of the present invention has three leaf springs 52 on each pawl. The leaf springs 52 also align the pawl with the ratchet drum teeth for engagement therewith when the drive mechanism housing 42 rotates in response to the downward motion of the float 16.

The drive mechanism housing 42 also includes waterproof sealing means for preventing water from entering the enclosure surrounding the ratchet drum 40. In the preferred embodiment a lip 54 extends annularly around each end of the drive mechanism housing 42 to form a cylindrical cavity 56 on each end. Each cylindrical cavity 56 receives a waterproof packing material made of synthetic rubber such as nitrile, neoprene, silicon or butyl which forms a watertight seal between the drive shaft 18 and the drive mechanism housing 42.

Figure 13:
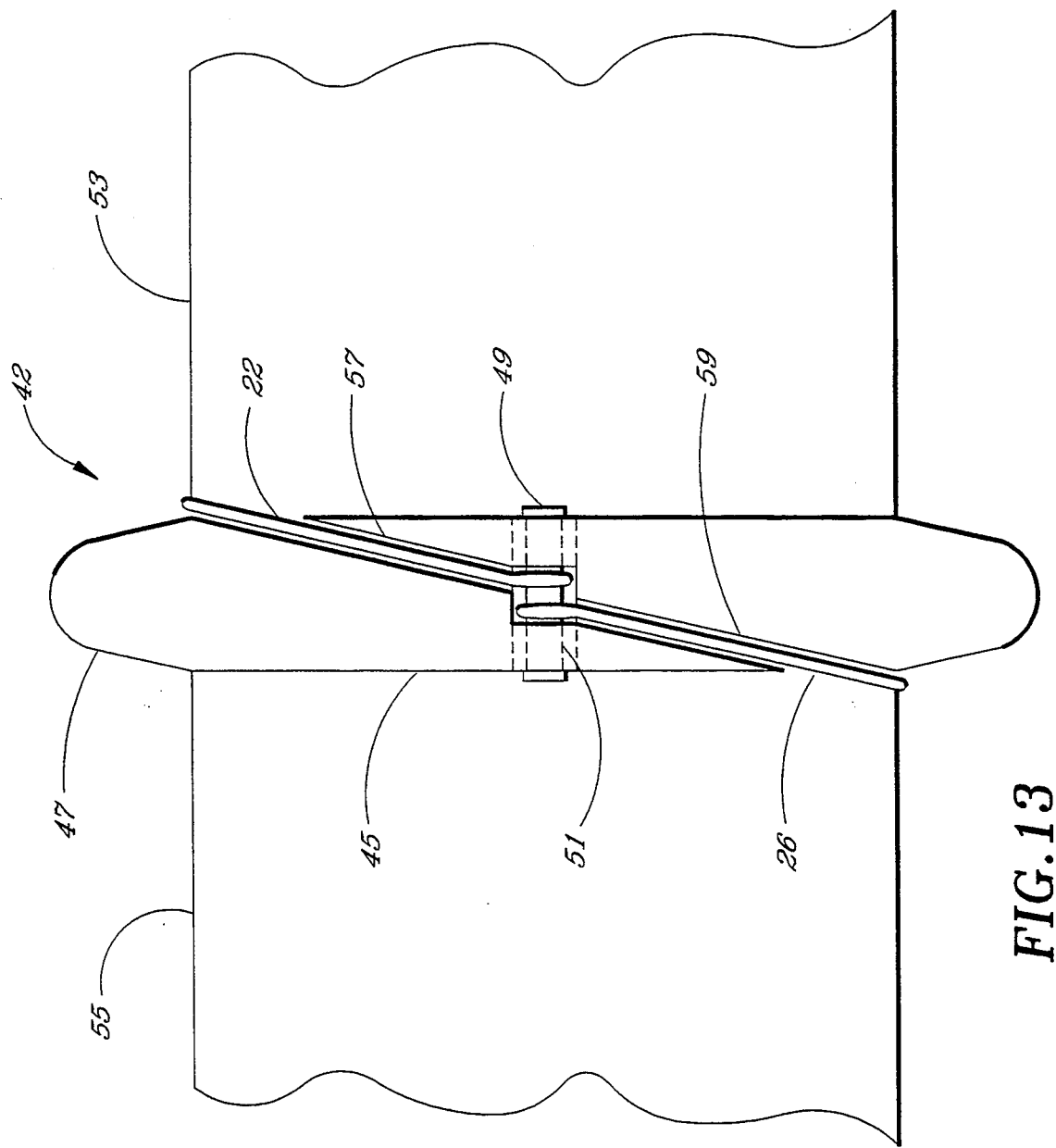
FIG. 13 is a frontal view of the cable guide means.

As best seen in FIG. 13 the drive mechanism housing 42 also includes cable guide means 45 for guiding the float cable means 22 and the counter-weight cable means 26 to prevent entanglement during operation. In the preferred embodiment of the present invention, the cable guide means 45 is comprised of a center partition 47 extending around the center circumference of the drive mechanism housing 42, a removable pin 49 for attaching the float cable means 22 and the counter-weight cable means 26 to the drive mechanism housing 42 and a keyway 51 for receipt of the removable pin 49. The center partition 47 divides the outer surface of the drive mechanism housing into a float cable means section 53 and a counter-weight cable means section 55.

The float cable means 22 is connected at one end to the float 16 and at the other end to the outer surface of the drive mechanism housing 42 through the cable guide means 45. The center partition 47 has a groove 57 which receives the float cable means 22 and guides the float cable means 22 to the float cable means section 53. The float cable means 22 is wound around the outer surface of the drive mechanism housing 42 onto the float cable means section 53 a number of times sufficient to allow the float 16 a full range of unimpeded up and down motion in response to the rise and fall of waves on the surface of the water.

The counter-weight cable means 26 is connected at one end to the counter-weight 24 and at the other end to the outer surface of the drive mechanism housing 42, through the cable guide means 45. The center partition 47 has a groove 59 which receives the counter-weight cable means 26 and guides the counter-weight cable means to the counter-weight cable means section 55. The counter-weight cable means 26 is wound around the outer surface of the drive mechanism housing 42, in a direction opposite to that of the float cable means 22, onto the counter-weight cable means section 55, a number of times sufficient to allow the counter-weight 24 a full range of upward motion when the counter-weight rises as the drive mechanism housing 42 rotates in response to the downward motion of the float 16. A pulley system 39, shown in FIG. 4, may be utilized to guide the counter-weight cable means 26 and to reduce the range of vertical motion traveled by the counter-weight 24 as the float 16 rises and falls, thus preventing the counter-weight 24 from hitting the float 16 during operation.

Figure 14:
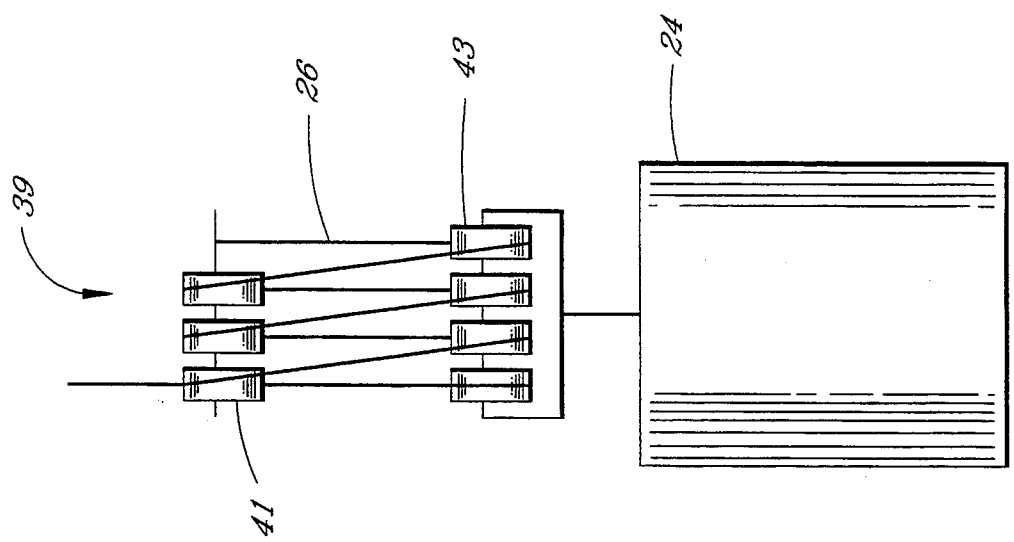
FIG. 14 is a frontal view showing the pulley system means.

The pulley system 39 is of the type well known in the art. As shown in FIG. 14 the pulley system 39 in the present invention includes a top fixed pulley 41 which is secured to the pylon 14 and a bottom movable pulley 43 to which the counter-weight 24 is attached. The pulley system 39 is arranged so that the lowest position of the counter-weight 24 is above the highest position of float 16 as the float moves upwards in response to the rise of a wave crest. The pulley system 39 is attached to the pylon 14.

An alternate embodiment of the invention is illustrated in FIG. 11, is generally designated by the numeral 11 and has a plurality of conversion units 13 which are operatively interconnected. In this embodiment, the pylon 14 is cylindrical with a bottom portion submerged beneath the surface of the body of water and a top portion extending well above the surface of the water. Connected to the bottom portion of the pylon 14 is a buoyancy means 58 which has a buoyant force that urges the pylon 14 upwards. The pylon 14 is held rigidly in place by a first set of cables 60 attached to the seabed by anchors 62 and connected to the pylon 14 below the buoyancy means 58 and by a second set of cables 64 attached to the seabed by anchors 62 and connected to the pylon above the first set of cables 60. The second set of cables 64 can be attached to the pylon 14 either above or below the buoyancy means 58. In this alternate embodiment of the present invention, the preferred embodiment has the second set of cables 64 attached to the pylon above the buoyancy means 58.

In operation, the float 16 rises in response to a wave crest. As the float 16 rises, the counter-weight 24 falls under the influence of gravity. The downward motion of the counter-weight 24 is transferred to the drive mechanism housing 42 through the counter-weight cable means 26 in a direction which does not allow the pawls 44 to engage the teeth of the ratchet drum, since the pawls 44 can pivot in this direction. The leaf springs 52 touch the teeth to guide the pawls 44 as the drive mechanism housing 42 rotates. Thus, as the float moves upwards no rotation is transmitted to the drive shaft 18.

As the wave passes, the float 16 falls under the influence of gravity. This downward motion of the float 16 is transmitted through the float cable means 22 to the drive mechanism housing 42 causing the drive mechanism housing 42 to rotate in a predetermined direction. As the drive mechanism housing 42 rotates in response to the downward motion of the float 16, the pawls 44 engage the teeth of the ratchet drum 40 causing the ratchet drum 40 and the drive shaft 18 to rotate in the same predetermined direction as the drive mechanism housing 42.

In actual operation of the preferred embodiment in a body of water, and in order to obtain continuous rotation of the drive shaft 18, a plurality of the conversion units 12 are connected by coupling the drive shaft 18 of each conversion unit 12 to that of another conversion unit 12, with a terminal conversion unit 12 being connected to a central electrical energy conversion platform 65 for transforming the rotation of the drive shaft into useful electrical energy. In one configuration, best seen in FIG. 1, the conversion units 12 will be aligned end to end so that a particular wave will pass the conversion units 12 sequentially rather than simultaneously, thus providing a smoother conversion of the wave action into rotation of the drive shaft 18.

Figure 2:
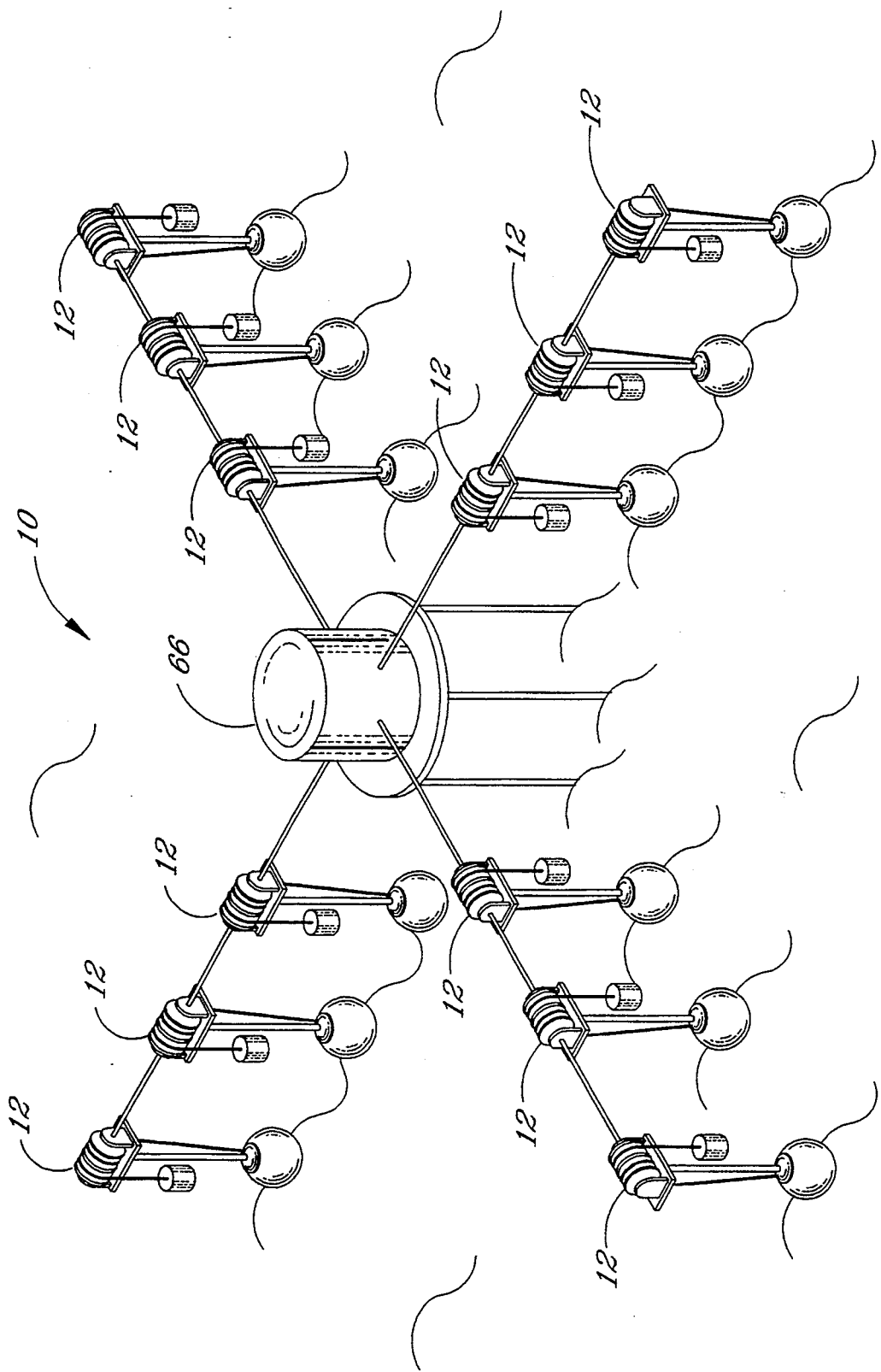
FIG. 2 is a pictorial view showing an alternative arrangement of several interconnected conversion units embodying the invention.

In an alternative configuration, best seen in FIG. 2 the conversion units 12 will extend radially from a central electrical energy conversion platform 66, with each line of interconnected conversion units 12 connecting to an electrical generator located on the energy conversion platform 66.

Figure 1:
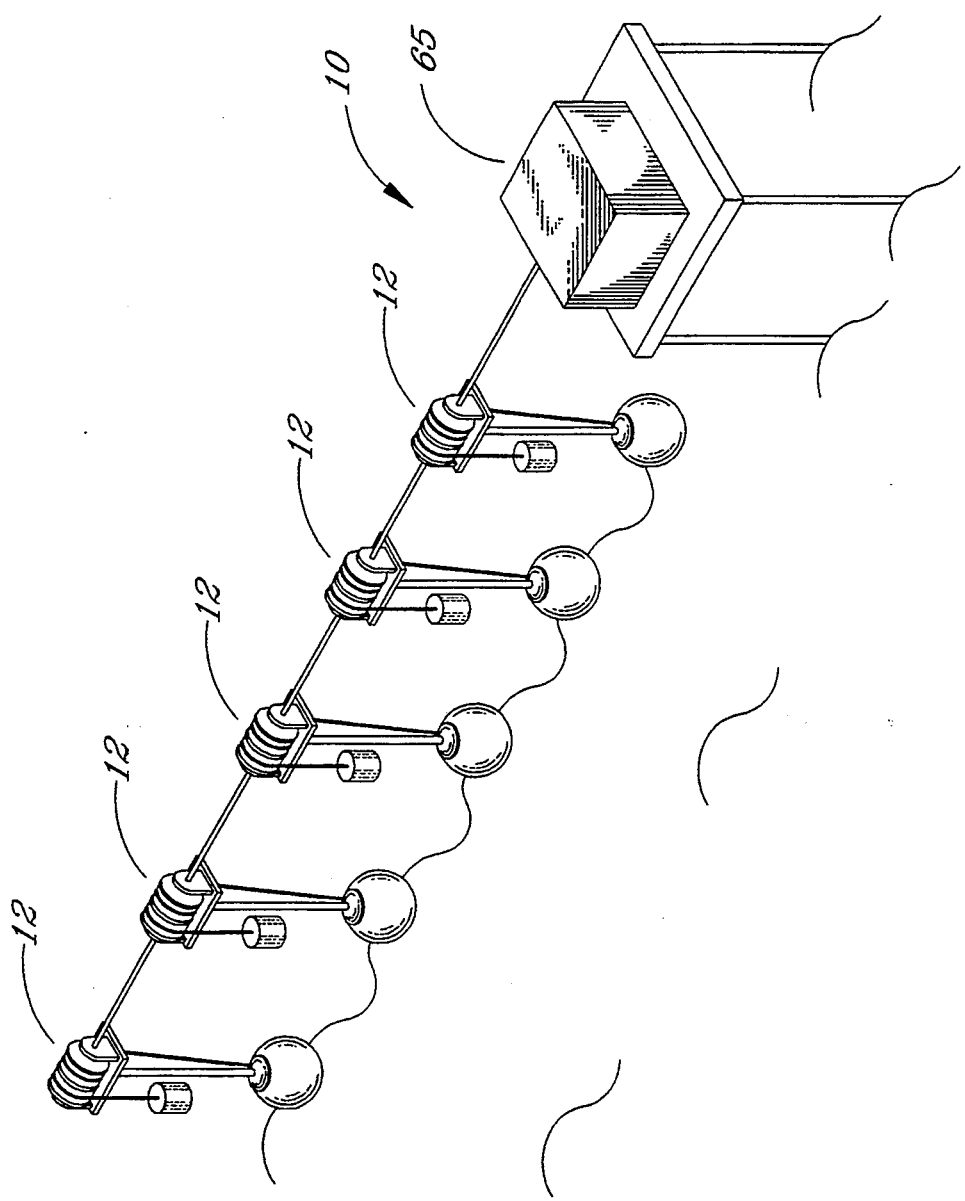
FIG. 1 is a pictorial view showing an arrangement of several interconnected conversion units embodying the invention.

These two configurations shown in FIGS. 1 and 2 can also be configured using the alternative embodiment of the conversion unit 13 shown in FIG. 11.

It will be evident to those skilled in the art that many modifications of the present invention are possible without materially departing from the scope of this invention. Accordingly, all such modifications are intended to be included within the scope of this invention as defined by the following claims.

What is claimed is:

1. An apparatus for converting water wave motion into electrical energy, comprising:
   a) a plurality of interconnected conversion units, each conversion unit including:
      A) support means mounted in a substantially fixed position relative to the surface of a body of water;
      B) float means slideably mounted to the support means;
      C) a drive shaft rotatably mounted to the support means;
      D) pulley system means attached to the support means;
      E) float cable means having a first end attached to the float and a second end;
      F) a counter-weight connected to the pulley system means;
      G) counter-weight cable means having a first end attached to the pulley system means and a second end, the counter-weight cable means being looped through the pulley system means to reduce the vertical motion of the counter weight in response to the rise and fall of waves;

H) a downstroke drive transfer mechanism for rotating the shaft in a predetermined direction in response to the downward movement of the float means, the downstroke drive transfer mechanism comprising, i) a hollow drive mechanism housing rotatably mounted to the drive shaft, the drive mechanism housing having a float cable means section and a counter-weight cable means section, ii) a cylindrical ratchet drum housed within the drive mechanism housing and secured to the drive shaft, iii) cable guide means on the outside surface of the drive mechanism housing, the cable guide means being attached to the second end of the float cable means and to the second end of the counter-weight cable means, the float cable means being wound around the float cable means section of the drive mechanism housing in a first direction and the counter-weight cable means being wound around the counter-weight cable means section of the drive mechanism housing in a second direction opposite to that of the first direction, iv) means for transferring the rotation of the drive mechanism housing caused by the downward motion of the float means to the ratchet drum;

b) means connected to the drive shaft for converting the rotation of the drive shaft into electrical energy.

2. The apparatus of claim 1 wherein the support means comprises:

a) a vertical pylon having a lower portion submerged beneath the surface of the water and an upper portion above the surface of the water;

b) means for anchoring the pylon to the floor of the body of water.

3. The apparatus of claim 2 wherein the float means comprises:

a) a shell having a generally spherical exterior and an internal chamber for receipt of a ballast means, the shell further having a central opening through which the shell is slideably mounted to the pylon; and b) ballast means.

4. The apparatus of claim 3 wherein the shell further comprises:

a) a central guide means slideably mounted to the pylon for constraining the shell to generally vertical motion parallel to the axis of the pylon.

5. The apparatus of claim 4 wherein the central guide means comprises:

a) a guide sleeve mounted to the central opening of the shell and a plurality of roller bearings secured to the guide sleeve for easily sliding up and down the vertical pylon.

6. The apparatus of claim 1 wherein the means for transferring the rotation of the drive mechanism housing to the ratchet drum comprises:

a) a plurality of teeth secured to the outer surface of the ratchet drum that run parallel to the drive shaft;

b) a plurality of pawls each pivotally connected at one end to the inside surface of the drive mechanism housing for drivably engaging the teeth on the ratchet drum; and c) pawl biasing means for limiting the pivotal movement of each pawl.

7. The apparatus of claim 6 wherein the support means comprises:

a) a vertical pylon having a lower portion submerged beneath the surface of the water and an upper portion above the surface of the water;

b) means for anchoring the pylon to the floor of the body of water.

8. The apparatus of claim 7 wherein the float means comprises:

a) a shell having a generally spherical exterior and an internal chamber for receipt of a ballast means, the shell further having a central opening through which the shell is slideably mounted to the pylon; and b) ballast means.

9. The apparatus of claim 8 wherein the shell further comprises:

a) a central guide means slideably mounted to the pylon for constraining the shell to generally vertical motion parallel to the axis of the pylon.

10. The apparatus of claim 9 wherein the central guide means comprises:

a) a guide sleeve mounted to the central opening of the shell and a plurality of roller bearings secured to the guide sleeve for easily sliding up and down the vertical pylon.

11. The apparatus of claim 10 wherein the pylon further comprises:

a) buoyancy means attached to the lower portion of the pylon whereby the pylon is urged upwards due to buoyant forces.

12. The apparatus of claim 11 wherein the means for anchoring the pylon to the floor of a body of water comprises:

a) a first set of cables, the first set having a plurality of cables, each cable having a first end attached to the lower portion of the pylon and a second end attached to the floor of the body of water; and b) a second set of cables, the second set having a plurality of cables, each cable having a first end attached to the pylon above the first set of cables and below the buoyancy means and a second end attached to the floor of the body of water.

13. The apparatus of claim 6 wherein the cable guide means further comprises:

a) a center partition extending around the center circumference of drive mechanism housing, the center partition having a keyway for receipt of a removable pin;

b) a removable pin;

c) a first groove for receipt of the float cable means; and d) a second groove for receipt of the counter-weight cable means.

14. The apparatus of claim 13 wherein the support means comprises:

a) a vertical pylon having a lower portion submerged beneath the surface of the water and an upper portion above the surface of the water;

b) means for anchoring the pylon to the floor of the body of water.

15. The apparatus of claim 13 wherein each pawl further comprises:

a) at least one leaf spring, the leaf spring being connected to the pawl so that one end of the leaf spring matingly engages the teeth on the ratchet drum, thus positioning the pawl for engaging the ratchet drum teeth when the float is moving downwards.

16. The apparatus of claim 15 wherein the drive mechanism housing further comprises:
   a) roller bearing means on each end for rotatably mounting the drive mechanism housing to the drive shaft; and
   b) waterproof sealing means to create a watertight seal between the drive mechanism housing and the drive shaft.

17. The apparatus of claim 16 wherein the float means comprises:
   a) a shell having a generally spherical exterior and an internal chamber for receipt of a ballast means, the shell further having a central opening through which the shell is slideably mounted to the pylon; and
   b) ballast means.

18. The apparatus of claim 17 wherein the shell further comprises:
   a) a central guide means slideably mounted to the pylon for constraining the shell to generally vertical motion parallel to the axis of the pylon.

19. The apparatus of claim 18 wherein the central guide means comprises:
   a) a guide sleeve mounted to the central opening of the shell and a plurality of roller bearings secured to the guide sleeve for easily sliding up and down the vertical pylon.

20. An apparatus for converting water wave motion into electrical energy, comprising:
   a) a plurality of interconnected conversion units, each conversion unit including:
      A) support means mounted in a substantially fixed position relative to the surface of a body of water, the support means comprising a vertical pylon having a lower portion submerged beneath the surface of the water and an upper portion above the surface of the water and means for anchoring the pylon to the floor of the body of water;
      B) float means, the float means comprising a shell and ballast means, the shell having a generally spherical exterior and an internal chamber for receipt of the ballast means, the shell further having a central opening through which the shell is slideably mounted to the pylon;
      C) a drive shaft rotatably mounted to the support means in a position above the float means;
      D) pulley system means attached to the support means;
      E) float cable means having a first end attached to the float;
      F) a counter-weight connected to the pulley system means;
      G) counter-weight cable means having a first end attached to the pulley system means and a second end, the counter-weight cable means being looped through the pulley system means to reduce the vertical motion of the counter-weight in response to the rise and fall of waves;
      H) a downstroke drive transfer mechanism for rotating the shaft in a predetermined direction in response to the downward movement of the float means, the downstroke drive transfer mechanism comprising a cylindrical ratchet drum secured to the drive shaft having a plurality of teeth on the outer surface that run parallel to the drive shaft, and further comprising a drive mechanism housing, the inside of the drive mechanism housing being hollow, having a plurality of pawls each pivotally connected at one end to the inside surface of the drive mechanism housing for drivably engaging the teeth on the ratchet drum assembly, the drive mechanism housing further comprising pawl biasing means for limiting the pivotal movement of each pawl, each pawl having at least one leaf spring, each leaf spring connected to the pawl so that one end of the leaf spring matingly engages the teeth on the ratchet drum assembly when the float means is moving upwards for preventing the pawl from striking the ratchet drum teeth, thus positioning the pawl for engaging the ratchet drum assembly teeth when the float means is moving downwards, the drive mechanism housing further comprising cable guide means on the outside surface of the drive mechanism housing for connecting the float cable means and the counter-weight cable means to the drive mechanism housing and for preventing the entanglement of the float cable means and the counter-weight cable means, the drive mechanism housing further having roller bearing means for rotatably mounting the drive mechanism housing to the drive shaft so that the drive mechanism housing pawls matingly engage the ratchet drum assembly teeth when the float means is moving downwards, the drive mechanism housing having waterproof sealing means to create a watertight seal between the drive mechanism housing and the drive shaft, the float cable means having a first end attached to the float means and a second end attached to the cable guide means, the counter-weight cable means having a first end attached to the pulley system means and a second end attached to the drive mechanism housing for causing the drive mechanism housing to rotate when the float means is moving downwards, the counter-weight being connected to the pulley system means for preventing the counter-weight from striking the float when it moves downward;
   b) means connected to the drive shaft for converting the rotation of the shaft into electrical energy.

21. The apparatus of claim 20 wherein the shell further comprises:
   a) a central guide means slideably mounted to the pylon for constraining the shell to generally vertical motion parallel to the axis of the pylon.

22. The apparatus of claim 21 wherein the central guide means comprises:
   a) a guide sleeve mounted to the central opening of the shell and a plurality of roller bearings secured to the guide sleeve for easily sliding up and down the vertical pylon.

* * * * *